COLD CATHODE GAS LASER DISCHARGE TUBE

Original Filed Feb. 6, 1968

INVENTOR.
WILLIAM P. KOLB, JR.,
BY
Fox O. Fennin
ATTORNEY.

United States Patent Office

Re. 27,282
Reissued Feb. 15, 1972

27,282

COLD CATHODE GAS LASER DISCHARGE TUBE

William P. Kolb, Jr., Manhattan Beach, Calif., assignor to Hughes Aircraft Company, Culver City, Calif.

Original No. 3,495,119, dated Feb. 10, 1970, Ser. No. 703,384, Feb. 6, 1968. Application for reissue June 11, 1970, Ser. No. 45,602
Int. Cl. H01j *17/04;* H01s *3/22*
U.S. Cl. 313—217 7 Claims

Matter enclosed in heavy brackets [ ] appears in the original patent but forms no part of this reissue specification; matter printed in italics indicates the additions made by reissue.

ABSTRACT OF THE DISCLOSURE

A cold cathode gas laser discharge tube of improved design is disclosed. A cylindrical cathode is disposed coaxially about a capillary discharge tube. A substantial longitudinal overlap of the capillary discharge tube and the cathode provides a shorter structure than available in the prior art, while still allowing a large area cathode emitting surface for long-life operation.

Field of the invention

This invention relates to gas laser structures and more particularly to cold cathode gas discharge apparatus for use in such structures.

Description of the prior art

One of the more commonly used methods for pumping the active medium of gas lasers to the necessary inverted energy level condition is by means of a cathode-anode electron discharge. In the past, both hot cathode and cold cathode structures have been used. For relatively low power laser apparatus the cold cathode arrangement is generally preferred.

Understandably, much development effort has been expended in the design of gas laser discharge tubes. Such effort has been largely directed to the development of improved cathode materials and structural design to achieve efficient long-life operation.

Accordingly, it is an object of the present invention to increase the reliability and lifetime of cold cathode laser discharge tubes.

In the past, the cold cathode laser discharge tubes have taken one of two basic structural forms. The first structural form utilizes an elongated discharge tube with the cold cathode, and frequently the anode as well, mounted in extension tubes or bulbs off of the main axis of the tube. This arrangement, while satisfactory for many applications, requires considerable space to accommodate the extension tubes in which the electrodes are mounted.

The second basic structural form, as exemplified in an article entitled "Cold Cathodes for Possible Use in 6328 A. Single Mode He-Ne Gas Lasers" by U. Hochuli and P. Haldemann, appearing in The Review of Scientific Instruments, vol. 36, No. 10, October 1965 at p. 1403, utilizes a cathode which is coaxially disposed along a longitudinal extension of a capillary discharge tube. Although this arrangement achieves a smaller cross-section, it does so at the expense of a greater length. In many applications, however, it is desirable or necessary to make the discharge tube as compact as possible while preserving its long-life operating characteristics.

It is therefore another object of the present invention to provide a cold cathode laser discharge tube of decreased longitudinal and cross-sectional dimensions.

Summary of the invention

In accordance with the principles of the present invention, these objects are accomplished with a cylindrical cathode configuration which, to a substantial degree, is coextensive with the coaxially disposed capillary discharge tube. Electrons emitted from the surface of the cathode traverse a folded path through the bore entrance of the capillary discharge tube to the anode where they are collected. Areas of very high localized fields which give rise to rapid cathode sputtering and shortened lifetime are avoided in the cathode design.

A second embodiment utilizing a single cathode in conjunction with two anodes and two axially aligned capillary discharge tubes provides a longer effective discharge path but with lower discharge voltages than required by the sinle anode embodiment.

Brief description of the drawings

The above-mentioned and other features and objects of the present invention will become more apparent by reference to the following description taken in conjunction with the accompanying drawings, in which.

Description of the preferred embodiments

Figure 1:
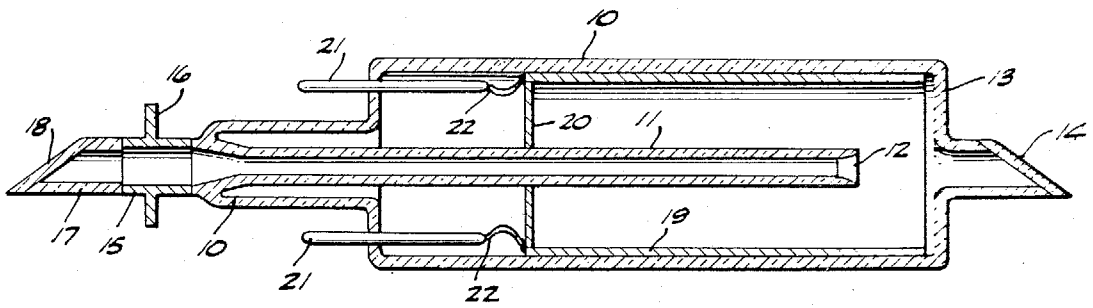
FIG. 1 is a cross-sectional view of a first embodiment of the present invention.

Referring more particularly to the drawings, FIG. 1 is a cross-sectional view of a preferred embodiment of the present invention. In FIG. 1 there is shown an outer envelope 10. Coaxially disposed and structurally integrated with envelope 10 is an elongated capillary discharge tube 11 having an open end region 12 communicating with the interior region of envelope 10. A first end member 13, which is sealed to envelope 10, is provided with an axially aligned light transmissive window 14. Window 14 is disposed opposite the end region 12 of discharge tube 11 and is preferably oriented at the so-called Brewster angle as shown.

A hollow anode 15, formed of conductive material, is coaxially disposed and bonded to the other end of capillary discharge tube 11, where it joins the narrowed end of envelope 10. Anode 15 can be fabricated of any suitable conductive material, such as Kovar, which can be readily fused or bonded to glass. Anode 15 can be provided with an annular flange 16 or other suitable means for facilitating mechanical and electrical connections. It is apparent that the anode shown in FIG. 1 is merely illustrative of one possible anode configuration. Other anode configurations can be readily adapted for use in the present invention if desired.

A second end member 17, having a second light transmissive window 18, is bonded, fused or otherwise joined to anode 15 opposite the second end of capillary discharge tube 11. Envelope 10, capillary discharge tube 11 and end members 13 and 17 are all fabricated of glass, quartz, or other suitable dielectric material, and together with anode 15, form a hollow gas-tight structure, for containing the gaseous medium.

A cathode electrode 19 of cylindrical cross-section is disposed within envelope 10, with its outer surface substantially coinciding with the inside surface of envelope 10. Cathode 19 extends longitudinally from the end of envelope 10 near end member 13 toward the opposite end. There is thus a substantial longitudinal overlap of cathode 13 and capillary discharge tube 11. An annular supporting ring 20 is mechanically joined to cathode 19, thereby lending structural support and spacing for capillary discharge tube 11 and cathode 19.

Many materials have been suggested for use as cold cathodes in laser discharge tubes. See, for example, the above-cited article "Cold Cathodes for Possible Use in 6328 A. Single Mode He-Ne Gas Lasers." In addition, it has been found that tantalum, having a thin oxide layer, is also well-suited for use in the fabrication of cold cathode 19. Supporting ring 20 can be formed of the same material or other suitable conductive or dielectric materials without detracting appreciably from the operation of the present invention.

Conductive pins 21 extend through envelope 10 and are joined to cathode 19 by means of spring-like conductors 22. In addition to providing electrical coupling, pins 21, with conductors 22, also lend structural support to cathode 19. Although two conductive pins 21 are shown in the embodiment of FIG. 1, it is apparent that only one is necessary to provide electrical contact to cathode 19. In practice, however, two, three, or even more may be desirable for mechanical support.

In operation, the gas through which the electrical discharge is to take place is confined within the structure of FIG. 1, usually at a very low pressure. To establish the electrical discharge a suitable power supply of conventional design, not shown, is connected between the cathode 19 and anode 15 by means of pins 21 and flange 16, respectively. The power supply, as is well-known in the art, should be capable of providing a relatively high voltage at a relatively low current. The magnitudes of the voltage and current are largely determined by the particular design requirements of the discharge tube.

Electrons emitted from the inner surface of cathode 19, traverse a path through the open end 12 of capillary discharge tube 11 on their way to the inner surface of anode 15 where they are collected. The emitted electrons, in traversing this path interact with the gas within the discharge tube, thereby ionizing a portion of the atoms thereof and creating the desired discharge and energy level population inversion. When used in a laser oscillator structure, the cold cathode laser discharge tube of FIG. 1 can be disposed in an appropriate resonant optical cavity which is provided with output coupling means for extracting a portion of the output wave energy. In the alternative, windows 14 and 18 can be replaced by reflecting members such as mirrors for a unitary laser oscillator structure.

Figure 2:
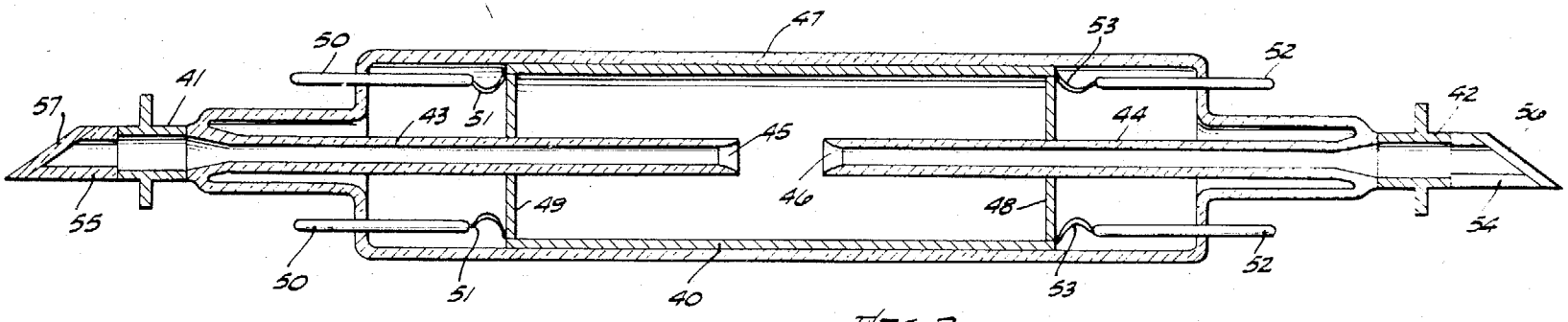
FIG. 2 is a cross-sectional view of a second embodiment of the present invention.

A second embodiment of the present invention, capable of providing greater output power but also utilizing the overlapping cold cathode configuration, is shown in the cross-sectional view of FIG. 2. The embodiment of FIG. 2 is a symmetrical extension of the embodiment of FIG. 1, incorporating a single cathode 40 and two anodes 41 and 42. The capillary discharge tubes 43 and 44 are both provided with first end regions 45 and 46 which communicate with the interior region of the device. The second ends of capillary discharge tubes 43 and 44 are, as before, sealed to an outer envelope 47 which surrounds cathode 40.

Cathode 40 is mechanically supported at either end by first and second supporting rings 48 and 49. Conductive pins 50 extend through the wall of envelope 47 and are conductively connected to cathode 40 by means of spring-like conductors 51. A second pair of pins 52 and spring-like contuctors 53 are similarly provided at the other end region of cathode 40. As mentioned hereinabove, all of the pins 50 and 52 are not essential to the operation of the present invention since adequate electrical coupling is provided by one pin. However, in order to provide increased structural support for cathode 40, pins and spring-like conductors can be utilized.

To complete the structure of FIG. 2, end members 54 and 55, each provided with optically transmissive windows 56 and 57, respectively, are fused or otherwise joined to the outer end regions of anodes 42 and 41. Thus, the entire structure forms a gas-tight container for confining the gaseous medium therein.

The operation of the device is similar to that of FIG. 1, except that both anodes 41 and 42 are coupled to the source of electrical potential. Appropriate means, such as potentiometers, can be provided in the power supply circuit to equalize the current to each anode, if desired. It should be noted that since the embodiment of FIG. 2 essentially consists of two parallel connected electron discharge paths the current drain upon the power supply will be substantially twice that of the embodiment of FIG. 1. However, since the two capillary discharge tubes 43 and 44 are coaxially aligned, the discharge length is effectively doubled.

In all cases it is understood that the above-described embodiments are merely illustrative of but a small number of the many possible specific embodiments which can represent applications of the present invention. Numerous and varied other arrangements, including other envelope and anode configurations, can be readily devised in accordance with these principles by those skilled in the art without departing from the spirit and scope of the invention.

What is claimed is:

1. A gas laser discharge apparatus comprising, in combination:

at least one elongated capillary discharge tube;

a cylindrical cathode electrode coaxially disposed with respect to said capillary discharge tube, the projection of said cathode and said capillary discharge tube being coextensive over a substantial portion of their respective lengths;

an anode electrode disposed at one end of said capillary discharge tube;

envelope means surrounding said cathode and capillary discharge tube;

*coaxially aligned* end members [having axially aligned optically transmissive windows], said end members and said envelope being adapted to provide a gas-tight structure for confining a gaseous medium therein; and conductive means extending through said envelope, said conductive means being conductively connected to said cathode.

2. The gas laser discharge apparatus according to claim 1 wherein said anode is of cylindrical shape and is coaxially disposed at one end of said capillary discharge tube.

3. The gas laser discharge apparatus according to claim 1 wherein said cathode is fabricated of tantalum.

4. The gas laser discharge apparatus according to claim 3 wherein the inner surface of said cathode comprises a layer of tantalum oxide.

5. A gas laser discharge apparatus comprising, in combination:

first and second elongated capillary discharge tubes, said capillary discharge tubes being aligned along a common axis;

a cylindrical cathode electrode coaxially disposed with respect to said axis, said cathode electrode extending longitudinally a substantially distance along the respective lengths of said capillary discharge tubes, first and second anode electrodes disposed at opposite ends of said first and second capillary discharge tubes, respectively;

envelope means surrounding said cathode and capillary discharge tubes;

*coaxially aligned* end members [including axially aligned optically transmissive windows], said end members and said envelope being adapted to provide a gas-tight structure for containing a gaseous medium therein; and conductive means extending through said envelope, said conductive means being conductively connected to said cathode electrode.

6. The gas laser discharge apparatus according to claim 5 wherein said cathode is fabricated of tantalum.

7. The gas laser discharge apparatus according to claim 6 wherein the inner surface of said cathode comprises a layer of tantalum oxide.

References Cited

The following reference, cited by the Examiner, are of record in the patented file of this patent or the original patent.

UNITED STATES PATENTS

| | | | |
|---|---|---|---|
| 3,396,301 | 8/1968 | Kobayashi et al. | 331—94.5 |
| 3,486,058 | 12/1969 | Hernqvist | 331—94.5 |

FOREIGN PATENTS

| | | | |
|---|---|---|---|
| 6707770 | 12/1967 | Netherlands | 313—220 |

ROY LAKE, Primary Examiner

P. C. DEMEO, Assistant Examiner

U.S. Cl. X.R.

313—220; 331—94.5